United States Patent [19]

Kamo et al.

[11] Patent Number: 5,585,173
[45] Date of Patent: Dec. 17, 1996

[54] HIGH-PURITY, OPAQUE QUARTZ GLASS, METHOD FOR PRODUCING SAME AND USE THEREOF

[75] Inventors: Kenji Kamo, Tsukuba; Kouichi Ono, Tsuchiura; Koji Tsukuma, Tsuchiura; Hiroya Nagata, Tsuchiura; Emiko Abe, Yamagata; Yoshikazu Kikuchi, Sagae; Yushiharu Funakoshi, Yamagata, all of Japan

[73] Assignees: Tosoh Corporation, Shinnanyo; Nippon Silica Glass Co., Ltd., Tokyo, both of Japan

[21] Appl. No.: 319,570

[22] Filed: Oct. 7, 1994

[30] Foreign Application Priority Data

Oct. 8, 1993 [JP] Japan ................................. 5-277729
Sep. 21, 1994 [JP] Japan ................................. 6-253001
Sep. 21, 1994 [JP] Japan ................................. 6-253004

[51] Int. Cl.$^6$ ......................................................... C03B 19/08
[52] U.S. Cl. .................... 428/304.4; 428/178; 428/312.6; 428/398; 428/446; 501/53; 501/54; 65/17.2; 65/17.3; 65/17.4; 65/17.6; 65/120; 65/DIG. 8; 65/DIG. 9
[58] Field of Search .................... 501/53, 54; 65/17.2, 65/17.3, 17.4, 17.6, 120, DIG. 9, DIG. 8; 428/178, 312.6, 398, 304.4, 446

[56] References Cited

U.S. PATENT DOCUMENTS

| | | | |
|---|---|---|---|
| 3,620,702 | 11/1971 | DeKalb | 65/17.4 |
| 3,837,825 | 9/1974 | Loxley et al. | 65/134.2 |
| 4,072,489 | 2/1978 | Loxley | 65/17.3 |
| 4,810,674 | 3/1989 | Che | 501/12 |

FOREIGN PATENT DOCUMENTS

| | | |
|---|---|---|
| 1-270530 | 10/1989 | Japan . |
| 1-270531 | 10/1989 | Japan . |
| 1-275438 | 11/1989 | Japan . |

OTHER PUBLICATIONS

Glass and Ceramics, vol. 48, No. 7/8, Jul/Aug. 1991, pp. 285–287, T. I. Prokhorova, et al., "A New Material-Quartz Light-Diffusing Glass".

*Primary Examiner*—Archene Turner
*Attorney, Agent, or Firm*—Oblon, Spivak, McClelland, Maier & Neustadt, P.C.

[57] ABSTRACT

The high-purity, opaque quartz glass containing $3 \times 10^6$–$9 \times 10^6$ of closed cells having an average size of 20–40 μm per 1 cm$^3$, a ratio of closed cells having sizes of 100 μm or more to the whole of cells being 1% or less, thereby showing 5% or less of linear transmittance for near infrared rays ($\lambda$=900 nm) at a thickness of 1 mm is produced by compacting amorphous silica powder having an average particle size of 0.5–10 μm, in which each of impurities selected from Li, Na, K, Fe, Ti and Al is 1 ppm or less, if any, and sintering the resultant green body at 1730°–1850° C.

17 Claims, 5 Drawing Sheets

HIGH-PURITY, OPAQUE QUARTZ GLASS, METHOD FOR PRODUCING SAME AND USE THEREOF

BACKGROUND OF THE INVENTION

The present invention relates to a high-purity, opaque quartz glass having an excellent capability of intercepting heat rays, and a method for producing such a high-purity, opaque quartz glass. Further, it relates to a flange and a tube made of such a high-purity, opaque quartz glass, and methods for producing them.

Because of high capability of intercepting heat rays, an opaque quartz glass has been widely used hitherto for furnace tubes and flanges for use in the production of semiconductors, etc. Since heat rays reflect on a surface of each cell contained in the opaque quartz glass, the dimension of the cell contained in the opaque quartz glass has a large influence on the capability of intercepting heat rays.

Most opaque quartz glass presently used contains closed cells having an average size of more than 50 μm in a proportion of $1 \times 10^6$ or less per 1 cm$^3$, more specifically $1 \times 10^4$–$1 \times 10^5$ per 1 cm$^3$, many of the closed cells having sizes of 100 μm or more. Some opaque quartz glass contains closed cells having an average size of 50 μm or less, but the number of the closed cells is $1 \times 10^6$ or less per 1 cm$^3$. Therefore, the whole surface area of the closed cells is inevitably as small as less than 50 cm$^2$ per 1 cm$^3$ in such opaque quartz glass resulting in a limited capability of intercepting heat rays.

The capability of intercepting heat rays has a close relation to transmittance of light, particularly for near infrared rays. Generally, the lower the transmittance for near infrared rays, the higher the capability of intercepting heat rays. Presently used opaque quartz glass has 10–50% of transmittance for near infrared rays ($\lambda$=900 nm) at a thickness of 3 mm, and presumably 30–60% at a thickness of 1 mm. These transmittance levels are too high to sufficiently intercept heat rays.

A opaque quartz glass is conventionally produced by melting natural materials such as silica and quartz in an electric furnace, or by melting the natural materials together with blowing agents such as $CaCO_3$. Since the opaque quartz glass thus produced contains impurities such as alkali substances, it is difficult to use the resulting glass as materials for parts for use in the production of semiconductors, etc.

Conventional opaque quartz glass produced from natural materials and blowing agents contains over 1 ppm of impurities such as Na and Fe. In addition, since a conventional opaque quartz glass flange, for instance, is produced by forming a bulk of opaque quartz glass and machining the bulk into a predetermined shape, large percentages of materials are lost, leading to an extremely poor yield and thus to a high production cost. Further, since a sealing surface of the conventional flange is ground, it suffers from degradation, because cells exposed on the sealing surface by grinding are etched.

Figure 1:
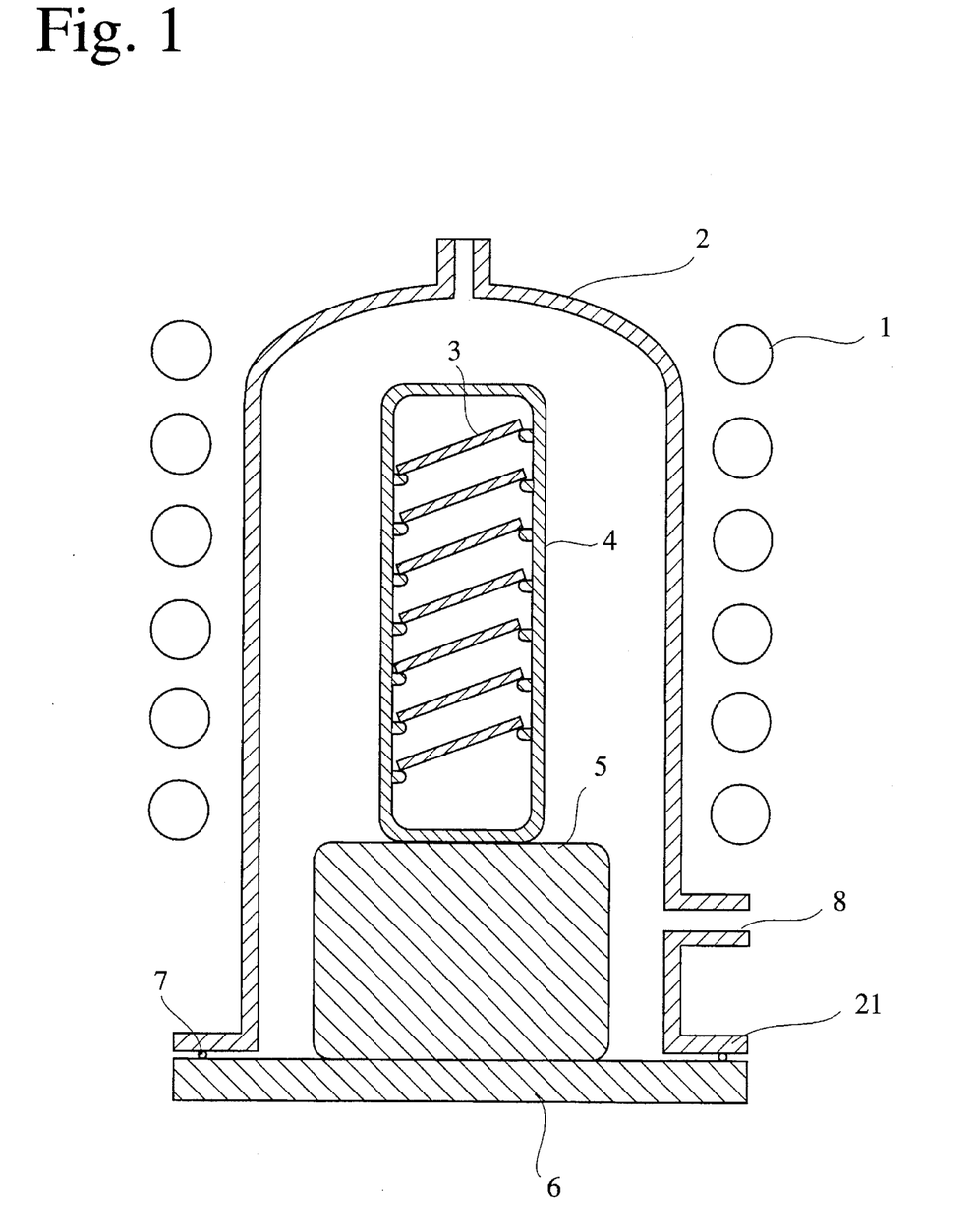
FIG. 1 is a cross-sectional view showing a conventional apparatus for heat-treating silicon wafer.

The opaque quartz glass is useful for a furnace tube in a silicon wafer-treating apparatus, etc. A typical example of such a silicon wafer-treating apparatus is shown in FIG. 1. The apparatus comprises a heater 1, a furnace tube 2, silicon wafer 3, a support member 4 for supporting the silicon wafer 3, a heat-keeping cylindrical base member 5 for supporting the support member 4, and a base plate 6. A flange 21 is integrally mounted to the lower end of the furnace tube 2. A seal ring 7 is set between the flange 21 and the base plate 6.

Generally, the furnace tube 2 and the flange 21 are separately produced and connected together by welding, etc.

With respect to an opaque quartz glass tube, it is conventionally produced by pulling a molten opaque quartz glass obtained from natural materials such as silica and quartz in a tubular shape, or by centrifugally casting the molten opaque quartz glass in a rotary furnace. Since the conventional opaque quartz glass tube thus produced also contains large cells whose sizes have a broad particle distribution, it fails to sufficiently intercept heat rays. As a result, it is difficult to use such a glass tube as a heat-resistant part in the production of semiconductors, etc.

Further, since a force applied to a molten glass in the pipe-pulling process or the centrifugal casting process functions to make the cells long and narrow and to make the distribution of cells uneven, the resulting opaque quartz glass tube has poor mechanical strength.

OBJECTS AND SUMMARY OF THE INVENTION

Accordingly, an object of the present invention is to provide a high-purity, opaque quartz glass having an excellent capability of intercepting heat rays.

Another object of the present invention is to provide a method for producing such a high-purity, opaque quartz glass.

A further object of the present invention is to provide a flange having good flatness and made of high-purity, opaque quartz glass.

A still further object of the present invention is to provide a method for producing such a flange.

A still further object of the present invention is to provide a tube made of high-purity, opaque quartz glass.

A still further object of the present invention is to provide a method for producing such a tube.

As a result of intense research in view of the above objects, the inventors have found that by sintering a green body made from fine silica powder at a particular temperature, the resulting opaque quartz glass has high purity and high content of fine closed cells, showing an excellent capability of intercepting heat rays; that by sintering the green body made from the silica powder in a flange or tube shape at a particular temperature, the resulting flange and tube of the opaque quartz glass have an excellent capability of intercepting heat rays; finding wide applications as parts for use in the production of semiconductors, etc.

Thus, the high-purity, opaque quartz glass according to the present invention contains $3 \times 10^6$–$9 \times 10^6$ of closed cells having an average size of 20–40 μm per 1 cm$^3$, a ratio of closed cells having sizes of 100 μm or more to the whole of cells being 1% or less, thereby showing 5% or less of linear transmittance for near infrared rays ($\lambda$=900 nm) at a thickness of 1 mm.

The method for producing the high-purity, opaque quartz glass according to the present invention comprises the steps of compacting amorphous silica powder having an average particle size of 0.5–10 μm, in which each of impurities selected from Li, Na, K, Fe, Ti and Al is 1 ppm or less, if any, and sintering the resultant green body at 1730°–1850° C.

The glass flange made of the high-purity, opaque quartz glass according to the present invention contains $3 \times 10^6$–$9 \times 10^6$ of closed cells having an average size of 20–40 μm per 1 cm$^3$, a ratio of closed cells having sizes of 100 μm or more to the whole of cells being 1% or less, thereby showing 5% or less of linear transmittance for near infrared rays (λ=900 nm) at a thickness of 1 mm.

The method for producing the high-purity, opaque quartz glass flange according to the present invention comprises the steps of compacting amorphous silica powder having an average particle size of 0.5–10 μm, in which each of impurities selected from Li, Na, K, Fe, Ti and Al is 1 ppm or less, if any, and sintering the resultant green body at 1730°–1850° C.

The glass tube made of the high-purity, opaque quartz glass according to the present invention contains $3×10^6$–$9×10^6$ of closed cells having an average size of 20–40 μm per 1 cm$^3$, a ratio of closed cells having sizes of 100 μm or more to the whole of cells being 1%, or less, thereby showing 5% or less of linear transmittance for near infrared rays (λ=900 nm) at a thickness of 1 mm.

The method for producing the high-purity, opaque quartz glass tube according to the present invention comprises the steps of compacting amorphous silica powder having an average particle size of 0.5–10 μm, in which each of impurities selected from Li, Na, K, Fe, Ti and Al is 1 ppm or less, if any, and sintering the resultant green body at 1730° C. or higher using a heat source of an electric furnace or a flame.

DETAILED DESCRIPTION OF THE PREFERRED EMBODIMENTS

[1] Opaque quartz glass (1) Composition and structure

A high-purity, opaque glass according to the present invention contains $3×10^6$–$9×10^6$ of closed cells having an average size of 20–40 μm per 1 cm$^3$, thus showing 5% or less of linear transmittance for near infrared rays (λ=900 nm) at a thickness of 1 mm. As mentioned above, the capability of intercepting heat rays is enhanced by increasing the reflection of heat rays on surfaces of cells contained in the quartz glass, and thus by increasing the whole surface area of cells per a unit volume. However, since most of conventional opaque quartz glass contains $1×10^6$ or less of closed cells having an average size of 50 μm or more per 1 cm$^3$, sufficient capability of intercepting heat rays has not been achieved.

Since the opaque quartz glass of the present invention contains closed cells of 40 μm or less in average size in a proportion of $3×10^6$ or more per 1 cm$^3$, it has an increased whole surface area of cells. Specifically, the high-purity, opaque quartz glass of the present invention has a whole surface area of 100–200 cm$^2$ per 1 cm$^3$, much larger than the whole surface area of 80 cm$^2$ or less per 1 cm$^3$ for commercially available opaque quartz glass articles.

The high-purity, opaque glass according to the present invention contains few cells having sizes of 100 μm or more, namely 1% or less to the whole of cells, contributing to a great increase in the whole surface area of cells. This is also a remarkable advantage of the high-purity, opaque quartz glass of the present invention over commercially available ones.

The capability of intercepting heat rays has a close relation to transmittance of light, particularly for near infrared. Generally, the lower the transmittance for near infrared, the higher the capability of intercepting heat rays. In the high-purity, opaque quartz glass according to the present invention, the linear transmittance for near infrared rays (λ=900 nm) at a thickness of 1 mm is 5% or less, preferably 0.1–2%, which is never achieved by commercially available opaque quartz glass articles.

In the present invention, the excellent capability of intercepting heat rays is obtained by making cells smaller and by increasing their number, and thus by increasing the whole surface are of the cells.

The average size of the cells is calculated by averaging diameters of 50 or more cells on an optical photomicrograph of a sample finish-baked with oxyhydrogen flame. The number of cells per 1 cm$^3$ is calculated from the number of cells measured at each predetermined depth of focus of an optical microscope.

Further, the high-purity, opaque quartz glass according to the present invention may contain impurities such as Li, Na, K, Mg, Ti, V, Cr, Mn, Fe, Co, Ni, Cu, Zn and Al, but at least amounts of Li, Na, K, Mg, Ti, Cr, Fe, Ni, Cu and Al should be as small as 1 ppm or less each, if any. Amounts of V and Mn, should be as small as 0.1 ppm or less each, if any.

(2) Method for producing the opaque quartz glass

The high-purity, opaque quartz glass according to the present invention may be produced as follows:

(a) Starting materials

High-purity, amorphous silica powder is used as a starting material. Although amorphous silica powder is usually produced by removing Na from sodium silicate, by hydrolyzing silicon alkoxide or by thermal-hydrolyzing silicon tetrachloride, the amorphous silica powder used in the present invention must be as pure as each 1 ppm or less in Li, Na, K, Fe, Ti, Al, etc., if any.

The amorphous silica powder is pulverized by a ball mill and so on to an average particle size of 0.5–10 μm, preferably 3–7 μm. When amorphous silica powder having an average particle size of less than 0.5 μm is used, the resulting opaque quartz glass contains cells having an average size of less than 20 μm. On the other hand, when the amorphous silica powder has an average particle size of more than 10 μm, the cells have an average size of over 40 μm and the number of the cells is insufficient, failing to sufficiently intercept heat rays.

The average size of the amorphous silica powder is calculated by a laser diffraction scattering method.

(b) Compacting

The amorphous silica powder is compacted by a usual wet or dry compacting method. As for the wet compacting, for example, a casting method may advantageously be used, wherein a dispersion of amorphous silica powder in pure water is charged into a cavity of a gypsum mold or a porous resin mold. Cold isostatic pressing or die pressing may be used in the dry compacting method.

(c) Sintering

The resulting green body is sintered at 1730°–1850° C., preferably 1750°–1800° C. Crystals are likely to be formed on a surface of the resultant sintered body at lower than 1730° C., while fine cells are merged into larger cells at over 1850° C.

The sintering time is preferably 10 minutes or less, more preferably 3–5 minutes. In the temperature elevation process to 1730°–1850° C., it is not preferable to keep the green body at 1400°–1600° C. for 2 hours or more, because crystallization is likely to take place at this temperature, resulting in a remarkable decrease in the number of cells, though crystals are made glassy at 1730° C. or higher.

A sintering atmosphere may preferably be $N_2$, $O_2$, Ar or a mixture thereof, though not restricted thereto. Non-oxidizing gas such as $N_2$ may preferably be used in the case of sintering in a carbon resistance oven. The sintering pressure is preferably 1–2 kgf/cm$^2$, more preferably 1.2–1.5 kgf/cm$^2$. Cells are likely to expand in the sintering process under vacuum or reduced pressure.

By the above sintering, voids between silica particles are turned into closed cells. The average size of the closed cells may be controlled to 20–40 μm by using silica powder having an average particle size of 0.5–10 min.

[2] Opaque quartz glass flange (1) Flange

The flange of the present invention is in a ring-shaped projection to be mounted to the lower end of a furnace tube and so on. The term "flange" is derived from its shape similar to a collar or an annular projection on a pipe and so on. The flange discussed here may be the same as indicated by a reference numeral 21 in FIG. 1.

(2) Composition and structure

The flange of the present invention is made of the same high-purity, opaque quartz glass as described in [1] above. Namely, it contains $3\times10^6$–$9\times10^6$ of closed cells having an average size of 20–40 μm per 1 cm$^3$, a ratio of closed cells having sizes of 100 μm or more to the whole of cells being 1% or less, thereby showing 5% or less of linear transmittance for near infrared rays ($\lambda$=900 nm) at a thickness of 1 mm.

(3) Production method (a) Starting materials

A starting material used for producing the opaque quartz glass flange may be the same high-purity amorphous silica powder as described in [1] (2) (a). Namely, it has an average particle size of 0.5–10 μm, preferably 3–7 μm, and may contain impurities such as Li, Na, K, Fe, Ti and Al in a proportion of each 1 ppm or less, if any. The particle size of the amorphous silica powder has a close relation to facility in compacting. When amorphous silica powder having an average particle size of less than 0.5 μm is used, large shrinkage and cracking occur by drying. On the other hand, when the average particle size is over 10 μm, it is difficult to provide a green body with high strength and a high-precision flange shape.

(b) Compacting

The silica powder is preferably compacted to a flange shape by a casting method in which a slurry (dispersion of silica powder in pure water) is charged into a mold.

The slurry is prepared by dispersing amorphous silica powder in pure water by ultrasonic vibration or ball mill. Preferably 50–75% by weight of amorphous silica powder is added to pure water. Because there is no need for commonly used organic binders and dispersion agents, the resulting opaque quartz glass flange is highly pure. In the case of ball milling, balls and a pot made of plastics, silica glass, agate and so on are preferably used to prevent contamination.

A mold may be a gypsum mold, a water-absorbing resin mold made of porous plastics and so on, preferably a porous resin mold made of epoxy resins and acrylic resins. In the case of using a gypsum mold, the opaque quartz glass flange may contain 2–3 ppm of Ca, but Ca does not harm the performance of the flange. With respect to other harmful impurities of Li, Na, K, Mg, Ti, Fe, Cu, Ni, Cr and Al, they should be 1 ppm or less each, if any. In the case of a porous resin mold, the resulting opaque quartz glass flange is as pure as the starting amorphous silica powder.

(c) Sintering

A green body made from silica powder is first calcined at 1000°–1400° C. for 1–20 hours to make the texture of a green body uniform.

The calcined body is then sintered at 1730°–1850° C., preferably at 1750°–1800° C. At 1600° C., for example, the closed cells have an average size of about 13 μm, failing to show enough opacity. When the sintering temperature is 1600° C. or higher and lower than 1730° C., crystallization often takes place on the green body surface, thereby causing cracking because of difference in a thermal expansion coefficient between a crystalline surface layer and an inner glass layer. At over 1850° C., it is difficult to keep the resulting glass flange from being deformed.

The sintering time at 1730°–1850° C. is preferably about 1 minute to several 10s minutes, more preferably 5–10 minutes, to keep the flange shape. In a typical example, the green body is preferably sintered at 1850° C. for 5 minutes. The heating speed from 1400° C. is preferably 300° C./hr or more, more preferably 500°–700° C./hr. The sintering atmosphere and pressure may be the same as described in [1] (2) (c) above.

[3] Opaque quartz glass tube (1) Composition and structure

The tube of the present invention is made of the same high-purity, opaque quartz glass as described in [1] above. Namely, it contains $3\times10^6$–$9\times10^6$ of closed cells having an average size of 20–40 μm per 1 cm$^3$, a ratio of closed cells having sizes of 100 μm or more to the whole of cells being 1% or less, thereby showing 5% or less of linear transmittance for near infrared rays ($\lambda$=900 nm) at a thickness of 1 mm.

(2) Production method (a) Starting materials

A starting material may be the same high-purity amorphous silica powder as described in [1] (2) (a) above. Namely, it may contain impurities such as Li, Na, K, Fe, Ti and Al in a proportion of each 1 ppm or less, if any, and has an average particle size of 0.5–10 μm, preferably 3–7 μm.

(b) Compacting

The silica powder may be compacted in a tubular shape by usual methods such as casting, cold isostatic pressing, die pressing, etc., and a casting method in which a slurry is charged into a porous resin mold is preferable.

The slurry may be prepared by dispersing silica powder in pure water by ultrasonic vibration or ball mill in the same manner as in the case of producing the flange. Organic binders and dispersion agents are not need.

Figure 2:
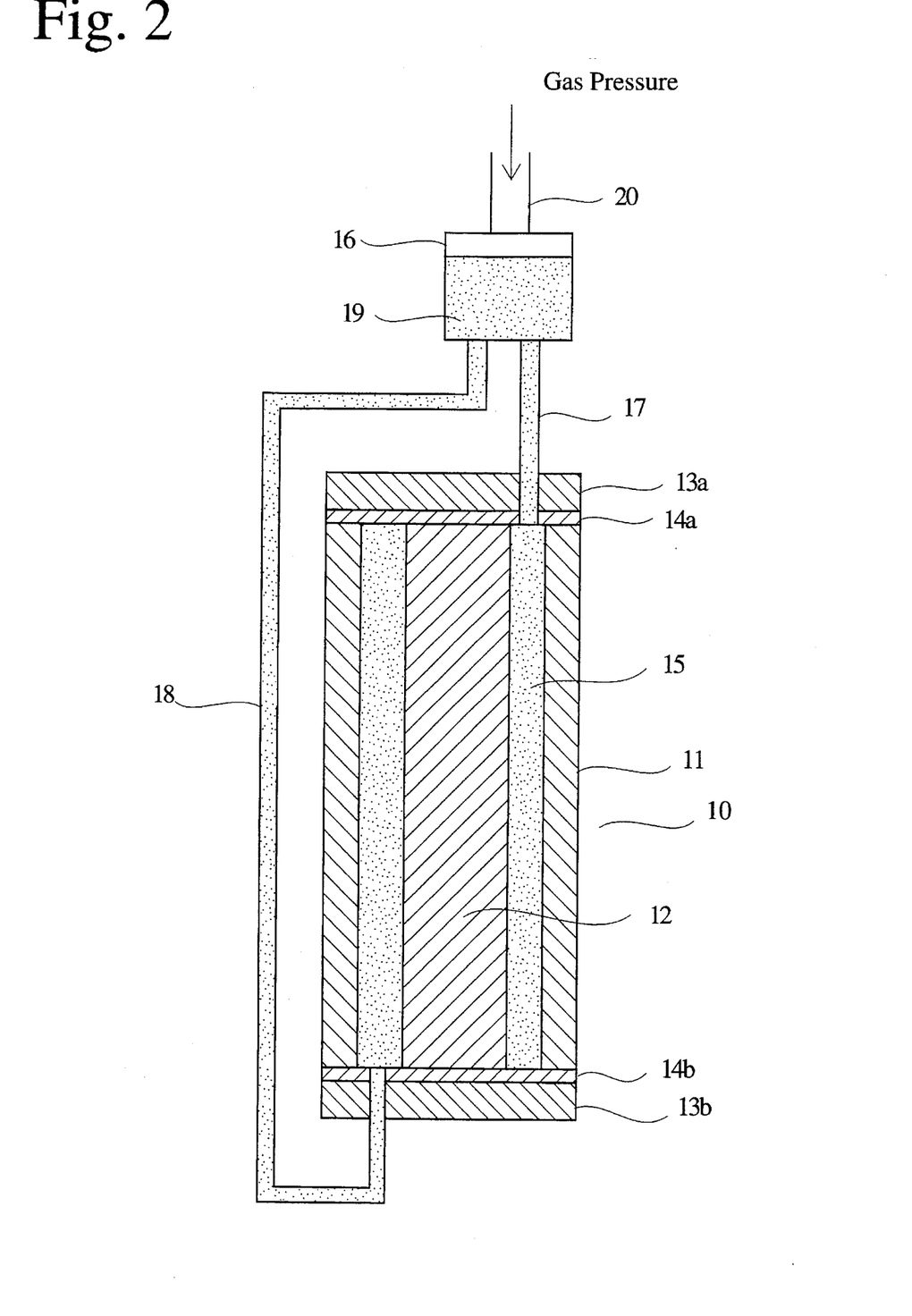
FIG. 2 is a cross-sectional view showing an example of an apparatus for producing a green body of an opaque quartz glass tube according to the present invention.

The silica powder may be formed into a tubular shape by charging the slurry into a porous, cylindrical mold under pressure and removing only water through the porous mold, leaving a solidified silica powder layer inside. An example of an apparatus used for producing the opaque quartz glass tube is shown in FIG. 2.

The apparatus comprises an outer, porous, cylindrical resin mold 11, a cylindrical core mold 12 made of vinyl chloride resin, metal covers 13a, 13b mounted to upper and lower sides of the outer, cylindrical resin mold 11 via rubber seals 14a, 14b, a cavity 15 defined by the outer mold 11, the core mold 12 and the covers 13a, 13b, a liquid container 16 having a pipe 17 connected to an upper end of the cavity 15 and a pipe 18 connected to a lower end of the cavity 15. The liquid container 16 has a pipe 18 through which a slurry 19 is charged. When a slurry 19 comprising silica powder and pure water is poured into the liquid container 16 through the pipe 20 under gas pressure of 1–5 kg/cm², it is forced to flow into the cavity 15 through one of the pipes 17, 18. After the lapse of sufficient time for producing a solidified green body of silica powder, an excess slurry is removed to obtain a green body in a tubular shape.

In this casting method, the cylindrical resin mold 11 filled with the slurry 19 is preferably reversed upside down at a predetermined interval to form a uniformly solidified green body. If the cylindrical resin mold 11 is fixed during the solidification process, the resultant tubular-shaped green body would have a thinner upper portion and a thicker lower portion. When the cylindrical resin mold 11 is turned upside down, pipes 17, 18 may be shut by stoppers (not shown) so that the slurry 19 may not flow back.

(c) Sintering

The resulting green body may be sintered by the following two methods:

In one method, the green body is heated for glassification at 1730° C. or higher, preferably 1750°–1800° C. by an oxyhydrogen flame. The glassification of the green body is preferably conducted by disposing the tubular green body on a glass lathe, and applying an oxyhydrogen flame to at least one of the inner and outer surfaces of the tubular green body while rotating it. To make it easy to mount the tubular green body onto the glass lathe and reduce a thermal shock of a flame, it is preferable to calcine the tubular green body at 1000°–1400° C. for 1–20 hours. The sintering time is preferably 1–120 minutes, more preferably 30–60 minutes. The sintering time is a total of a retention time and heating and cooling time above 1730° C. By this method, an opaque quartz glass tube as long as 300 mm or more can be produced.

In the other method, the green body is sintered at 1730°–1850° C. for about 1 minute to several 10s minutes, more preferably 5–10 minutes in an electric furnace. At lower than 1730° C. crystallization tends to take place on the green body surface, and at over 1850° C. it is difficult to keep the resulting glass in a tubular shape. The heating speed from 1400° C. preferably is 300° C./hr or more and more preferably 500°–700° C./hr. The sintering atmosphere and pressure may be the same as described in [1] (2) (c) above. Incidentally, it is preferable to calcine the green body at 1000°–1400° C. for 1–20 hours before sintering.

By either of the above sintering methods, voids between silica particles are turned into closed cells. The average size of the closed cells can be controlled to 20–40 μm by using silica powder having an average particle size of 0.5–10 μm.

The present invention will be explain in further detail by means of the following Examples, without intending to restrict the scope of present invention.

EXAMPLE 1

Amorphous silica powder produced by removing Na from sodium silicate and having an average particle size of 3.5 μm was compacted by cold isostatic pressing under 2 tons to obtain a cylindrical green body of 200 mm in diameter and 50 mm in thickness. This green body was placed in an electric furnace and heated to 1800° C. at a heating speed of 300° C. per 1 hour under $N_2$ pressure of 1 kgf/cm². After reaching 1800° C., it was kept at that temperature for 5 minutes. The resulting silica glass was white opaque.

The concentrations of impurities in the opaque quartz glass were measured by chemical analysis. The results are shown in Table 1. As is clear from Table 1, the opaque quartz glass of Example 1 was highly pure.

TABLE 1

| Elements | Content (ppm) | Elements | Content (ppm) |
|---|---|---|---|
| Li | 0.2 | Fe | 0.4 |
| Na | 0.9 | Co | 0.1 |
| K | 0.5 | Ni | 0.02 |
| Ti | 0.08 | Cu | 0.02 |
| V | 0.01 | Zn | 0.02 |
| Cr | 0.01 | Al | 0.5 |
| Mn | 0.01 | | |

The cell content, the whole surface area of cells and the ratio of cells having sizes of 100 μm or more to the whole cells were measured. The bulk density of the opaque quartz glass was also measured by an Archimedes method. Further, the opaque quartz glass was cut at a thickness of 1 mm and 3 mm, respectively to measure linear transmittance at a wavelength of 900 nm. The results are shown in Table 2.

EXAMPLE 2

Amorphous silica powder produced by removing Na from sodium silicate and having an average particle size of 5 μm was dispersed in pure water. The resulting slurry was cast into a porous resin mold to obtain a flange-shaped green body of 170 mm in outer diameter, 90 mm in inner diameter and 40 mm in height. After drying this green body, it was heated at 1100° C. for 10 hours under $N_2$ pressure of 1 kgf/cm² in an electric furnace. It was then heated to 1800° C. at a heating speed of 600° C. per 1 hour under pressure of 1.3 kgf/cm², and kept at that temperature for 5 minutes. The resulting silica glass flange had white opaque.

Figure 3:
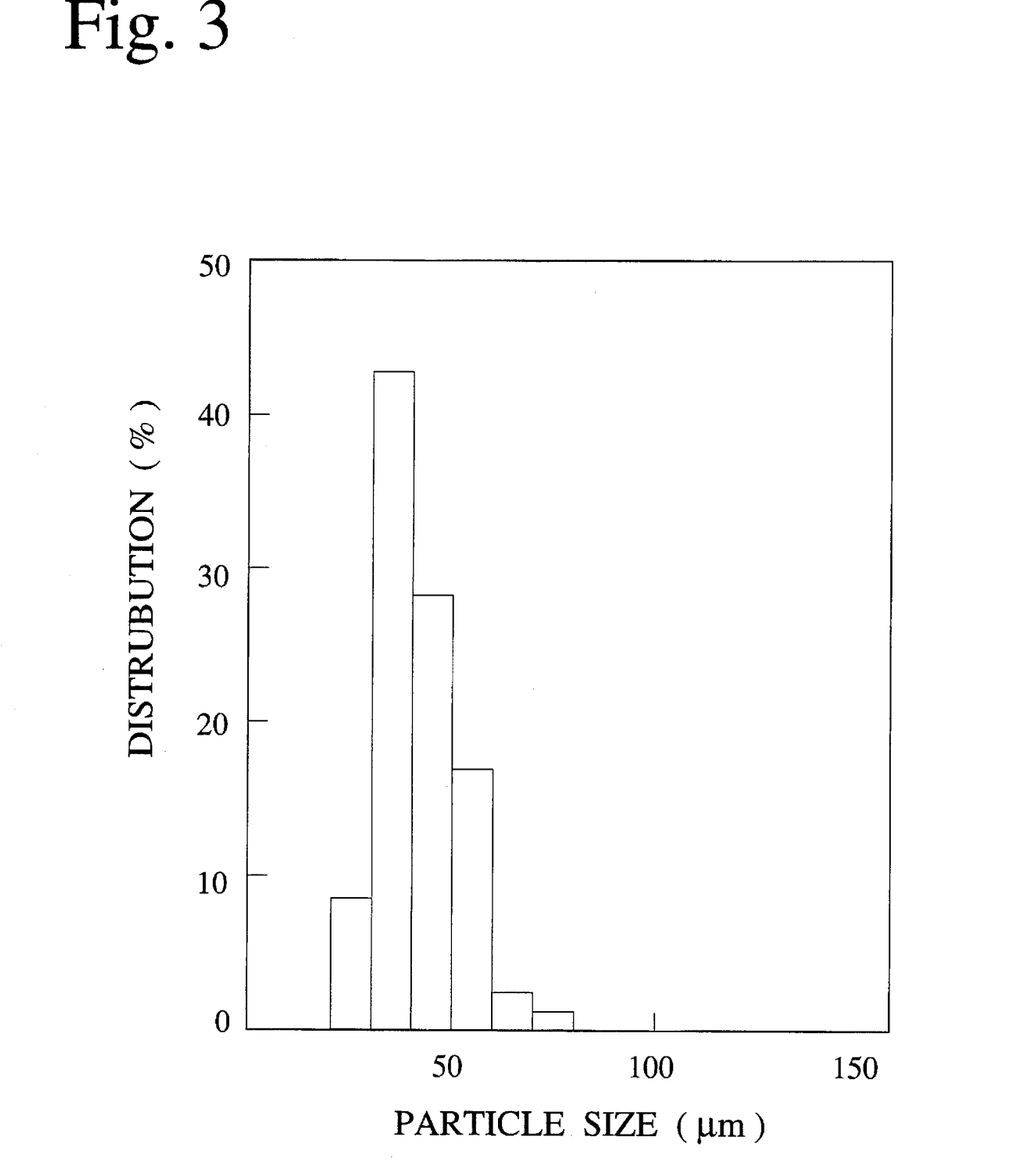
FIG. 3 is a graph showing a particle size distribution of cells in an opaque quartz glass of Example 2.

The cell content, the whole surface area of cells, the bulk density of the opaque quartz glass, the ratio of cells having sizes of 100 μm or more to the whole cells, and the linear transmittance at a wavelength or 900 nm were measured in the same manner as in Example 1. The results are shown in Table 2. The particle size distributions of cells in the opaque quartz glass of Examples 2 is shown in FIG. 3.

COMPARATIVE EXAMPLES 1–2

Figure 4:
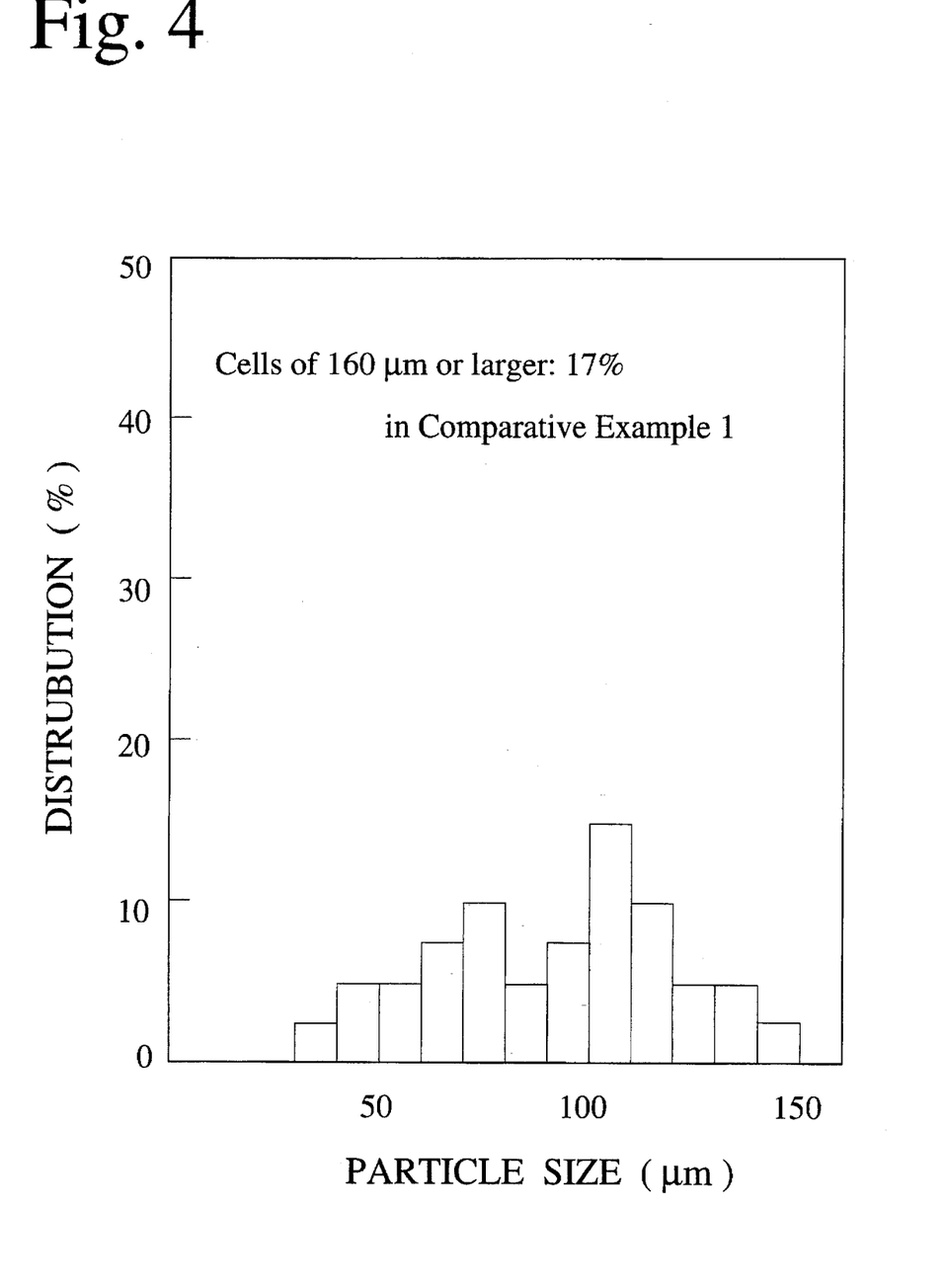
FIG. 4 is a graph showing a particle size distribution of cells in an opaque quartz glass of Comparative Example 1.
Figure 5:
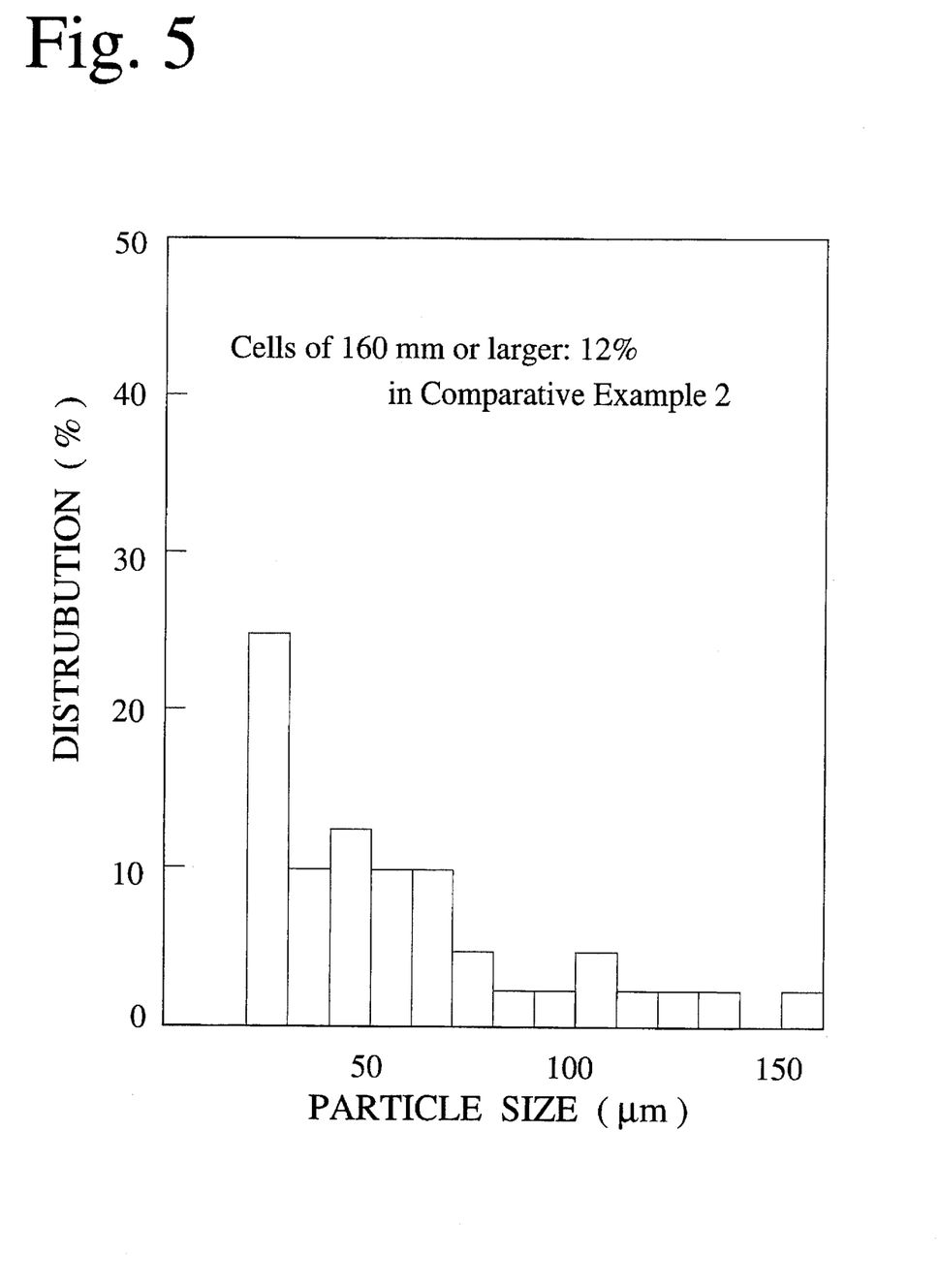
FIG. 5 is a graph showing a particle size distribution of cells in an opaque quartz glass of Comparative Example 2.

A commercially available opaque quartz glass produced by melting silica and quartz sand in an electric furnace (Comparative Example 1) and a commercially available opaque quartz glass produced by melting silica and quartz sand containing carbon as a blowing agent in an electric furnace (Comparative Example 2), the cell content, the whole surface area of cells, the bulk density, and the ratio of cells having sizes of 100 μm or more to the whole cells, and the linear transmittance at a wavelength of 900 nm were measured in the same manner as in Example 1. The results are shown in Table 2. The particle size distributions of cells in the opaque quartz glass of Comparative Examples 1 and 2 are shown in FIGS. 4 and 5, respectively.

TABLE 2

| Properties | Example 1 | Example 2 | Compara. Example 1 | Compara. Example 2 |
|---|---|---|---|---|
| Closed Cell | | | | |
| Average Size[1] | 28 | 32 | 113 | 74 |
| Content[2] | $6.2 \times 10^6$ | $5.2 \times 10^6$ | $7.5 \times 10^4$ | $2.8 \times 10^5$ |
| Whole Surface Area[3] | 180 | 167 | 30 | 49 |
| Percentage[4] | 0 | 0 | 66 | 22 |
| Bulk Density[5] | 1.99 | 2.08 | — | — |
| Linear Transmittance[6] | | | | |
| At 1 mm Thickness | 1 | 1 | 55[7] | 35[7] |
| At 3 mm Thickness | <1 | <1 | 40 | 11 |

Note:
[1]Unit: μm.
[2]Unit: Number of closed cells per 1 cm$^3$.
[3]Unit: cm$^2$/cm$^3$.
[4]A ratio of closed cells having sizes of 100 μm or more to the whole cells (unit: %).
[5]Unit: g/cm$^3$.
[6]Unit: %.
[7]Calculated values.

Table 2 and FIGS. 2-4 indicate that the closed cells contained in the opaque quartz glass of Examples 1 and 2 are much smaller and more uniform than those contained in the opaque quartz glass of Comparative Examples 1 and 2, meaning that the former shows higher capability of intercepting heat rays than the latter.

EXAMPLE 3

Amorphous silica powder having an average particle size of 5 μm was prepared by removing Na from sodium silicate. The concentration of impurities in the resulting amorphous silica powder was measured by chemical analysis. The results are shown in Table 4.

2500 g of the amorphous silica powder was dispersed in 1250 g of pure water by ultrasonic vibration for 6 hours. The resulting slurry was cast into a porous resin mold under pressure of 3 kgf/cm$^2$ to obtain a flange-shaped green body of 390 mm in outer diameter, 270 mm in inner diameter and 40 mm in height. After drying, this green body was heated at 1100° C. under N$_2$ pressure of 1 kgf/cm$^2$ for 10 hours in an electric furnace. It was then heated to 1800° C. at a heating speed of 350° C. per 1 hour under pressure 1.3 kgf/cm$^2$, and kept at that temperature for 1 minute. The resulting opaque silica glass flange was 350 mm in outer diameter, 240 mm in inner diameter and 35 mm in height.

The concentrations of impurities in the resulting opaque quartz glass flange were measured by chemical analysis. The results are shown in Table 4.

The cell content, whole surface area of cells and bulk density of the opaque quartz glass and the ratio of cells having sizes of 100 μm or more to the whole cells were also measured. Further, the opaque quartz glass was cut at a thickness of 1 mm to measure linear transmittance at a wavelength of 900 nm. The results are shown in Table 5.

The opaque quartz glass flange was ground by diamond abrasive grains to measure a maximum roughness ($R_{max}$) of the ground surface for comparison with that of a conventional opaque quartz glass produced by melting quartz in an electric furnace. The maximum roughness ($R_{max}$) is shown in Table 3.

TABLE 3

| | Example 3 | Conventional Glass |
|---|---|---|
| $R_{max}$ | 14.3 | 30.8 |

EXAMPLE 4

2500 g of the same amorphous silica powder as in Example 3 was dispersed in 1250 g of pure water by ultrasonic vibration for 6 hours. The resulting slurry was cast into a gypsum mold under pressure of 3 kgf/cm$^2$ to obtain a flange-shaped green body of 390 mm in outer diameter, 270 mm in inner diameter and 40 mm in height. This green body was heated at 1150° C. under N$_2$ pressure of 1 kgf/cm$^2$ for 15 hours in a carbon resistance. It was then heated to 1800° C. at a heating speed of 350° C. per 1 hour under pressure 1.3 kgf/cm$^2$, and kept at that temperature for 1 minute. The resulting opaque silica glass flange was 360 mm in outer diameter, 250 mm in inner diameter and 35 mm in height.

The concentrations of impurities in the resulting opaque quartz glass flange were measured by chemical analysis. The results are shown in Table 4.

TABLE 4

| Elements (ppm) | Silica powder[1] | Example 3 | Example 4 |
|---|---|---|---|
| Li | 0.1 | <0.1 | <0.1 |
| Na | 0.3 | 0.5 | 0.5 |
| K | 0.1 | 0.1 | 0.1 |
| Mg | 0.1 | <0.1 | <0.1 |
| Ca | 0.1 | 0.1 | 2.2 |
| Ti | 0.1 | 0.1 | 0.1 |
| Fe | 0.7 | 0.7 | 0.7 |
| Cu | <0.1 | <0.1 | <0.1 |
| Ni | <0.1 | <0.1 | <0.1 |
| Cr | 0.2 | 0.2 | 0.2 |
| Al | 0.8 | 0.7 | 0.7 |

Note:
[1]Starting material.

The cell content, whole surface area of cells and bulk density of the opaque quartz glass and the ratio of cells having sizes of 100 μm or more to the whole cells were also measured. Further, the opaque quartz glass was cut at a thickness of 1 mm to measure linear transmittance at a wavelength of 900 nm. The results are shown in Table 5.

TABLE 5

| Properties | Example 3 | Example 4 |
|---|---|---|
| Closed Cell | | |
| Average Size[1] | 28 | 32 |
| Content[2] | $6.2 \times 10^6$ | $5.2 \times 10^6$ |
| Whole Surface Area[3] | 180 | 167 |
| Percentage[4] | 0 | 0 |
| Bulk Density[5] | 2.06 | 2.08 |
| Linear Transmittance[6] | 2 | 2 |

Note:
[1]Unit: μm.
[2]Unit: Number of closed cells per 1 cm$^3$.
[3]Unit: cm$^2$/cm$^3$.
[4]A ratio of closed cells having sizes of 100 μm or more to the whole cells (unit: %).
[5]Unit: g/cm$^3$.
[6]At 1 mm thickness (unit: %).

Tables 4 and 5 indicate that the opaque quartz glass flanges of Examples 3 and 4 are highly pure, and that they meet the requirements of $3\times10^6$–$9\times10^6$ cells per 1 cm$^3$, an average cell size of 20–40 μm, and 5% or less of linear transmittance for near infrared rays ($\lambda$=900 nm) at a thickness of 1 mm. Table 3 indicates that the maximum roughness of the opaque quartz glass flange of Example 3 is smaller than that of the conventional one, proving that the opaque quartz glass flange of Example 3 have fine and uniform closed cells.

EXAMPLE 5

Amorphous silica powder having an average particle size of 5 μm was prepared by removing Na from sodium silicate. The concentrations of impurities in the resulting amorphous silica powder was measured by chemical analysis. The results are shown in Table 6.

2500 g of the amorphous silica powder was dispersed in 1250 g of pure water by ultrasonic vibration for 6 hours. The resulting slurry was cast under pressure of 3 kgf/cm$^2$ into a porous, cylindrical resin mold 10 shown in FIG. 2, which was 300 mm in outer diameter, 230 mm in inner diameter and 300 mm in height. After solidification for 80 minutes, the cylindrical resin mold 10 was turned upside down every 5 minutes to remove excess slurry to obtain a tubular-shaped green body of 230 mm in outer diameter, 214 mm in inner diameter and 300 mm in height. After calcining the green body for 10 hours at 1100° C., it was mounted to a glass lathe for sintering it while rotating by applying three oxyhydrogen flames for 40 minutes; one flame was applied to an inner wall of the tubular-shaped green body, while the others were applied to an outer wall of the green body. After cooling, an opaque quartz silica glass tube of 207 mm in outer diameter, 192 mm in inner diameter and 270 mm in height was obtained.

The concentrations of impurities in the resulting opaque quartz glass tube were measured by chemical analysis. The results are shown in Table 6.

The cell content, the whole surface area of cells, and the ratio of cells having sizes of 100 μm or more to the whole cells were measured in the same manner as in Example 1. The bulk density was measured by an Archimedes method. The opaque quartz glass was cut to a thickness of 1 mm to measure linear transmittance at a wavelength of 900 nm. These results are shown in Table 7.

EXAMPLE 6

2500 g of the same amorphous silica powder as in Example 5 was dispersed in 1250 g of pure water by ultrasonic vibration for 6 hours. The resulting slurry was cast under pressure of 1 kgf/cm$^2$ into a cylindrical gypsum mold of 200 mm in outer diameter, 150 mm in inner diameter and 400 mm in height. After solidification for 60 minutes, the cylindrical gypsum mold was turned upside down every 5 minutes to remove an excess slurry to obtain a tubular-shaped green body of 150 mm in outer diameter, 130 mm in inner diameter and 400 mm in height. After calcining the green body for 5 hours at 1200° C., it was mounted to a glass lathe for sintering by 3 oxyhydrogen flames for 40 minutes in the same manner as in Example 5. After cooling, an opaque quartz silica glass tube of 135 mm in outer diameter, 117 mm in inner diameter and 370 mm in height was obtained.

The concentrations of impurities in the resulting opaque quartz glass tube were measured by chemical analysis. The results are shown in Table 6.

The cell content, the whole surface area of cells, and the ratio of cells having sizes of 100 μm or more to the whole cells were measured in the same manner as in Example 1. The bulk density was measured by an Archimedes method. The opaque quartz glass was cut to a thickness of 1 mm to measure linear transmittance at a wavelength of 900 nm. These results are shown in Table 7.

EXAMPLE 7

Amorphous silica powder having an average particle size of 3 μm was prepared by removing Na from sodium silicate. 2500 g of the resulting amorphous silica powder having was dispersed in 1250 g of pure water by ultrasonic vibration for 6 hours. The resulting slurry was cast under pressure of 1 kgf/cm$^2$ into a cylindrical gypsum mold of 400 mm in outer diameter, 360 mm in inner diameter and 100 mm in height. After solidification for 60 minutes, the cylindrical gypsum mold was turned upside down every 5 minutes to remove an excess slurry to obtain a tubular-shaped green body of 360 mm in outer diameter, 340 mm in inner diameter and 100 mm in height from the cylindrical gypsum mold. This green body was heated at 1150° C. under N$_2$ pressure of 1 kgf/cm$^2$ for 15 hours in a carbon resistance oven. It was then heated to 1800° C. at a heating speed of 350° C. per 1 hour under pressure 1.3 kgf/cm$^2$, and kept at that temperature for 1 minute. The resulting opaque silica glass tube was 324 mm in outer diameter, 306 mm in inner diameter and 90 mm in height was obtained.

The concentrations of impurities in the resulting opaque quartz glass tube were measured by chemical analysis. The results are shown in Table 6.

The cell content, the whole surface area of cells, and the ratio of cells having sizes of 100 μm or more to the whole cells were measured in the same manner as in Example 1. The bulk density was measured by an Archimedes method. The opaque quartz glass was cut to a thickness of 1 mm to measure linear transmittance at a wavelength of 900 nm. These results are shown in Table 7.

COMPARATIVE EXAMPLE 3

The concentrations of impurities (values described in catalogue) of a commercially available opaque quartz glass tube (tradename: T-100 available from TOSHIBA CERAMICS CO., LTD.) are shown in Table 6.

TABLE 6

| Elements | Silica | Example | | | Com. Ex. |
|---|---|---|---|---|---|
| (ppm) | Powder[1] | 5 | 6 | 7 | 3[2] |
| Li | 0.1 | <0.1 | <0.1 | <0.1 | — |
| Na | 0.3 | 0.5 | 0.5 | 0.5 | 15 |
| K | 0.1 | 0.1 | 0.1 | 0.1 | 15 |
| Mg | 0.1 | <0.1 | <0.1 | <0.1 | — |
| Ca | 0.1 | 0.1 | 2.2 | 2.8 | — |
| Ti | 0.1 | 0.1 | 0.1 | 0.1 | — |
| Fe | 0.7 | 0.7 | 0.7 | 0.7 | 30 |
| Cu | <0.1 | <0.1 | <0.1 | <0.1 | — |
| Ni | <0.1 | <0.1 | <0.1 | <0.1 | — |
| Cr | 0.2 | 0.2 | 0.2 | 0.2 | — |
| Al | 0.8 | 0.7 | 0.7 | 0.7 | 130 |

Note:
[1]Starting material.
[2]values described in catalogue.

TABLE 7

| Properties | Example 5 | Example 6 | Example 7 |
|---|---|---|---|
| Closed Cell | | | |
| Average Size[1] | 28 | 32 | 33 |
| Content[2] | $6.2 \times 10^6$ | $5.2 \times 10^6$ | $3.8 \times 10^6$ |
| Whole Surface Area[3] | 180 | 167 | 150 |
| Percentage[4] | 0 | 0 | 0 |
| Bulk Density[5] | 2.06 | 2.08 | 2.08 |
| Linear Transmittance[6] | 2 | 2 | 4 |

Note:
[1]Unit: μm.
[2]Unit: Number of closed cells per 1 cm$^3$.
[3]Unit: cm$^2$/cm$^3$.
[4]A ratio of closed cells having sizes of 100 μm or more to the whole cells (unit: %).
[5]Unit: g/cm$^3$.
[6]At 1 mm thickness (unit: %).

Tables 6 and 7 indicate that the opaque quartz glass tubes of Examples 5, 6 and 7 are highly pure, and that they meet the requirements of $3 \times 10^6$–$9 \times 10^6$ cells per 1 cm$^3$, an average cell size of 20–40 μm, 1% or less of a ratio of closed cells having sizes of 100 μm or more to the whole of cells, and the whole cell surface area of 100–200 cm$^2$. Thus, the opaque quartz glass tubes of Examples 5, 6 and 7 meet the requirement of 5% or less of linear transmittance for near infrared rays (λ=900 nm) at a thickness of 1 mm.

As described above in detail, because the high-purity, opaque quartz glass according to the present invention has an excellent capability of intercepting heat rays, and because it is free from contamination with impurities, it can be widely used as materials for jigs, flanges, adiabatic fins, furnace tubes and so on in the production of semiconductors, etc.

Particularly, the flange made of the high-purity, opaque quartz glass according to the present invention is suitable as a flange of a furnace tube disposed in a diffusion furnace, an oxidation furnace, etc. for heat-treating silicon wafers for semiconductors.

Further, the tube made of the high-purity quartz glass according to the present invention is suitable as a liner tube, a furnace tube, a chemical refiner and so on in the production of semiconductors, etc.

What is claimed is:

1. A high-purity, white opaque quartz glass containing $3 \times 10^6$–$9 \times 10^6$ of closed cells having an average size of 20–40 μm per 1 cm$^3$, a ratio of closed cells having sizes of 100 μm or more to the whole of cells being 1% or less, thereby showing 5% or less of linear transmittance for near infrared rays (λ=900 nm) at a thickness of 1 mm.

2. The high-purity, white opaque quartz glass according to claim 1, wherein impurities selected from Li, Na, K, Mg, Ti, Fe, Cu, Ni, Cr and Al are contained in amounts each 1 ppm or less, if any.

3. A method for producing the high-purity, white opaque quartz glass according to claim 1, comprising the steps of compacting amorphous silica powder having an average particle size of 0.5–10 μm, each of impurities selected from Li, Na, K, Fe, Ti and Al being 1 ppm or less, if any; heating the resultant green body to 1750°–1850° C. at a heating speed of 300°–600° C. per hour; and sintering the green body at 1750°–1850° C.

4. A flange made of the high-purity, white opaque quartz glass according to claim 1.

5. A method for producing the high-purity, white opaque quartz glass flange according to claim 4, comprising the steps of compacting amorphous silica powder having an average particle size of 0.5–10 μm, each of impurities selected from Li, Na, K, Fe, Ti and Al being 1 ppm or less, if any; heating the resultant green body to 1750°–1850° C. at a heating speed of 300°–700° C. per hour after the temperature of the green body reaches 1400° C. and sintering the resultant green body at 1750°–1850° C.

6. The method for producing the high-purity, white opaque quartz glass flange according to claim 5, wherein a slurry comprising silica powder and pure water without an organic binder and a dispersing agent is cast into a water-absorbing mold to obtain a green body in a flange shape.

7. The method for producing the high-purity, white opaque quartz glass flange according to claim 5, wherein a green body made from silica powder is calcined at 1000°–1400° C. for 1–20 hours before it is sintered at 1750°–1850° C.

8. A tube made of the high-purity, white opaque quartz glass according to claim 1.

9. A method for producing the high-purity, white, opaque quartz glass tube according to claim 8, comprising the steps of compacting amorphous silica powder having an average particle size of 0.5–10 μm, each of impurities selected from Li, Na, K, Fe, Ti and Al being 1 ppm or less, if any; heating the resultant green body to 1750°–1850° C. at a heating speed of 300°–700° C. per hour after the temperature of the green body reaches 1400° C. and sintering the resultant green body at 1750° C. or higher using a heat source of an electric furnace or flame.

10. The method for producing the high-purity, white opaque quartz glass tube according to claim 9, comprising the steps of casting a slurry consisting essentially of silica powder and pure water into a cylindrical mold under pressure, and removing water through the porous mold to obtain a green body in a tubular shape, wherein said slurry is under pressure while filling said mold.

11. The method for producing the high-purity, white opaque quartz glass tube according to claim 10, further comprising the steps of reversing the cylindrical mold filled with the slurry upside down at a predetermined interval to form a uniformly solidified green body, wherein said slurry is under pressure while filling said mold.

12. The method for producing the high-purity, white opaque quartz glass tube according to claim 9, wherein a green body made from said silica powder is calcined at 1000°–1400° C. for 1–20 hours before it is sintered at 1750° C. or higher.

13. The method for producing the high-purity, white opaque quartz glass tube according to claim 9, comprising the steps of disposing the tubular green body on a glass lathe, and applying an oxyhydrogen flame to at least one of the inner and outer surfaces of the tubular green body while rotating it.

14. A method for producing a high-purity, white opaque quartz glass containing $3 \times 10^6$–$9 \times 10^6$ of closed cells having an average size of 20–40 μm per 1 cm$^3$, a ratio of closed cells having sizes of 100 μm or more to the whole of cells being 1% or less, thereby showing 5% or less of linear transmittance for near infrared rays, having a λ=900 nm, at a thickness of 1 mm, said method comprising the steps of compacting amorphous silica powder having an average particle size of 0.5–10 μm, each of impurities selected from Li, Na, K, Fe, Ti and Al being 1 ppm or less, heating the resultant green body to 1750°–1850° C. at a heating speed of 300°–600° C. per 1 hour, and sintering the green body at 1750°–1850° C. and at a pressure of 1–2 kgf/cm$^2$ in an atmosphere selected from the group consisting of $N_2$, $O_2$, Ar and a mixture thereof.

15. A method for producing a high-purity, white opaque quartz glass containing $3 \times 10^6 - 9 \times 10^6$ of closed cells having an average size of 20–40 μm per 1 cm$^3$, a ratio of closed cells having sizes of 100 μm or more to the whole of cells being 1% or less, thereby showing 5% or less of linear transmittance for near infrared rays, having a λ=900 nm, at a thickness of 1 mm, said method comprising the steps of casting a slurry consisting essentially of silica powder having an average particle size of 0.5–10 μm, each of impurities selected from Li, Na, K, Fe, Ti and Al being 1 ppm or less and pure water into a mold under pressure to obtain a green body; heating the resultant green body to 1750°–1850° C. at a heating speed of 300°–600° C. per 1 hour, and sintering the green body at 1750°–1850° C. and at a pressure of 1–2 kgf/cm$^2$ in an atmosphere selected from the group consisting of $N_2$, $O_2$, Ar and a mixture thereof.

16. The method for producing the high-purity, white opaque quartz glass flange according to claim 5, wherein the sintering of the green body is carried out at 1750°–1850° C. and at a pressure of 1–2 kgf/cm$^2$ in an atmosphere selected from the group consisting of $N_2$, $O_2$, Ar and a mixture thereof.

17. The method for producing the high-purity, white opaque quartz glass tube according to claim 11, comprising a further step of sintering the green body at 1750°–1850° C. and at a pressure of 1–2 kgf/cm$^2$ in an atmosphere selected from the group consisting of $N_2$, $O_2$, Ar and a mixture thereof.

* * * * *

UNITED STATES PATENT AND TRADEMARK OFFICE
CERTIFICATE OF CORRECTION

PATENT NO. : 5,585,173
DATED : December 17, 1996
INVENTOR(S) : Kenji KAMO, et al.

It is certified that error appears in the above-indentified patent and that said Letters Patent is hereby corrected as shown below:

On the title page in Item [75], the last inventor's first name should be:

-- Yoshiharu --

Signed and Sealed this

First Day of April, 1997

*Attest:*

BRUCE LEHMAN

*Attesting Officer*  *Commissioner of Patents and Trademarks*